(12) United States Patent
Yang

(10) Patent No.: US 7,848,097 B2
(45) Date of Patent: Dec. 7, 2010

(54) FIXING DEVICE FOR HARD DISK

(75) Inventor: Jian Yang, Shenzhen (CN)

(73) Assignees: Fu Zhun Precision Industry (Shen Zhen) Co., Ltd., Shenzhen, Guangdong Province (CN); Foxconn Technology Co., Ltd., Tu-Cheng, Taipei Hsien (TW)

( * ) Notice: Subject to any disclaimer, the term of this patent is extended or adjusted under 35 U.S.C. 154(b) by 233 days.

(21) Appl. No.: 12/264,916

(22) Filed: Nov. 5, 2008

(65) Prior Publication Data

US 2009/0279242 A1  Nov. 12, 2009

(30) Foreign Application Priority Data

May 9, 2008  (CN) .................... 2008 1 0067117

(51) Int. Cl.
*G06F 1/16* (2006.01)
*G06F 1/20* (2006.01)

(52) U.S. Cl. ..................... 361/679.33; 361/679.46; 248/694

(58) Field of Classification Search ............ 361/679.33; 248/694
See application file for complete search history.

(56) References Cited

U.S. PATENT DOCUMENTS

| | | | | |
|---|---|---|---|---|
| 5,652,695 A * | 7/1997 | Schmitt | .................. | 361/679.31 |
| 5,995,365 A * | 11/1999 | Broder et al. | .......... | 361/679.31 |
| 6,166,901 A * | 12/2000 | Gamble et al. | .......... | 361/679.34 |
| 6,416,031 B1 * | 7/2002 | Billman | ...................... | 248/694 |
| 6,545,865 B2 * | 4/2003 | Albrecht et al. | ........ | 361/679.34 |
| 6,775,132 B2 * | 8/2004 | Chen et al. | ............. | 361/679.33 |
| 6,798,652 B2 * | 9/2004 | Wang et al. | ............. | 361/679.33 |
| 7,441,744 B2 * | 10/2008 | Chen et al. | .................. | 248/694 |
| 7,486,509 B2 * | 2/2009 | Kim et al. | .............. | 361/679.34 |
| 7,672,136 B2 * | 3/2010 | He et al. | ...................... | 361/719 |
| 7,701,702 B2 * | 4/2010 | Chen et al. | ............. | 361/679.33 |
| 2006/0007650 A1 * | 1/2006 | Shim | .......................... | 361/685 |
| 2008/0128579 A1 * | 6/2008 | Chen et al. | .................. | 248/694 |
| 2009/0168325 A1 * | 7/2009 | Yeh et al. | ............... | 361/679.33 |
| 2009/0168326 A1 * | 7/2009 | Chen et al. | ............. | 361/679.39 |

* cited by examiner

*Primary Examiner*—Lisa Lea-Edmonds
(74) *Attorney, Agent, or Firm*—Frank R. Niranjan

(57) ABSTRACT

A fixing device for fixing a hard disk includes a fixing bracket and a wire clip for fastening the hard disk to the fixing bracket. The fixing bracket includes a supporting body to which the hard disk is attached and two fixing arms respectively at two opposite sides of the supporting body for sandwiching the hard disk therebetween. The clip includes two pressing parts engaging with the fixing bracket and the hard disk, resting on a top surface of the hard disk and urging the hard disk towards the supporting body, and a locking part extending downwardly from two ends of the two pressing parts and spanning over an end of the fixing bracket to reach a bottom surface of the supporting body and engage with the fixing bracket, thereby fastening the hard disk to the fixing bracket firmly.

17 Claims, 4 Drawing Sheets

FIXING DEVICE FOR HARD DISK

BACKGROUND

1. Field of the Invention

The present invention relates to a fixing device, and particularly to a fixing device with a clip for fastening a hard disk to the fixing device.

2. Description of Related Art

An electronic apparatus, such as a computer, or a server, usually comprises data storage devices, such as hard disks, compact disk read-only memories (CD-ROMs), digital video discs (DVDs), and floppy disks. These devices are typically added to increase the functionality of the electronic apparatus.

Sometimes, for engaging a hard disk having a different configuration with an engaging portion in a computer case, a fixing bracket is applied for mounting the hard disk thereon. An installation of the hard disk on the fixing bracket involves placing the hard disk in a holding portion of the fixing bracket and screwing a plurality of screws through side walls of the fixing bracket into two sides of the hard disk. For proper balanced installation of the hard disk, multiple screws should be fastened, which makes installation and removal of the hard disk tedious. Furthermore, the hard disk generates heat during an operation thereof; the heat should be removed to ensure a proper operation of the hard disk. However, the conventional fixing disk cannot totally satisfy such a requirement. In addition, the conventional fixing bracket cannot absorb vibration generated by the hard disk when it is in operation, whereby the hard disk unavoidably produces noise during operation thereof.

What is needed, therefore, is a fixing device which could fix the hard disk conveniently and securely and can overcome the above-mentioned disadvantages of the conventional fixing device.

SUMMARY

A fixing device for fixing a hard disk thereon, includes a fixing bracket and a wire clip for fastening the hard disk to the fixing bracket. The fixing bracket includes a supporting body to which the hard disk is attached and two fixing arms respectively at two opposite sides of the supporting body for sandwiching the hard disk therebetween. The clip is made of a resilient metal wire and includes two pressing parts engaging with the fixing arms and the hard disk, resting on a top surface of the hard disk and urging the hard disk towards the supporting body, and a locking part extending downwardly from two corresponding ends of the two pressing parts and spanning over an end of the fixing bracket to reach a bottom surface of the supporting body and engage with two protruding ribs of the fixing bracket, thereby fastening the hard disk to the fixing bracket firmly. Two heat-conducting pads are sandwiched between the hard disk and the supporting body of the fixing bracket. The heat-conducting pads also have a vibration-absorbing function. A plurality of fins extends from the supporting body for dissipating heat generated by the hard disk.

Other advantages and novel features of the present invention will become more apparent from the following detailed description of an embodiment/embodiments when taken in conjunction with the accompanying drawings.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiment. Moreover, in the drawings, like reference numerals designate corresponding parts throughout the several views.

DETAILED DESCRIPTION

Figure 1:
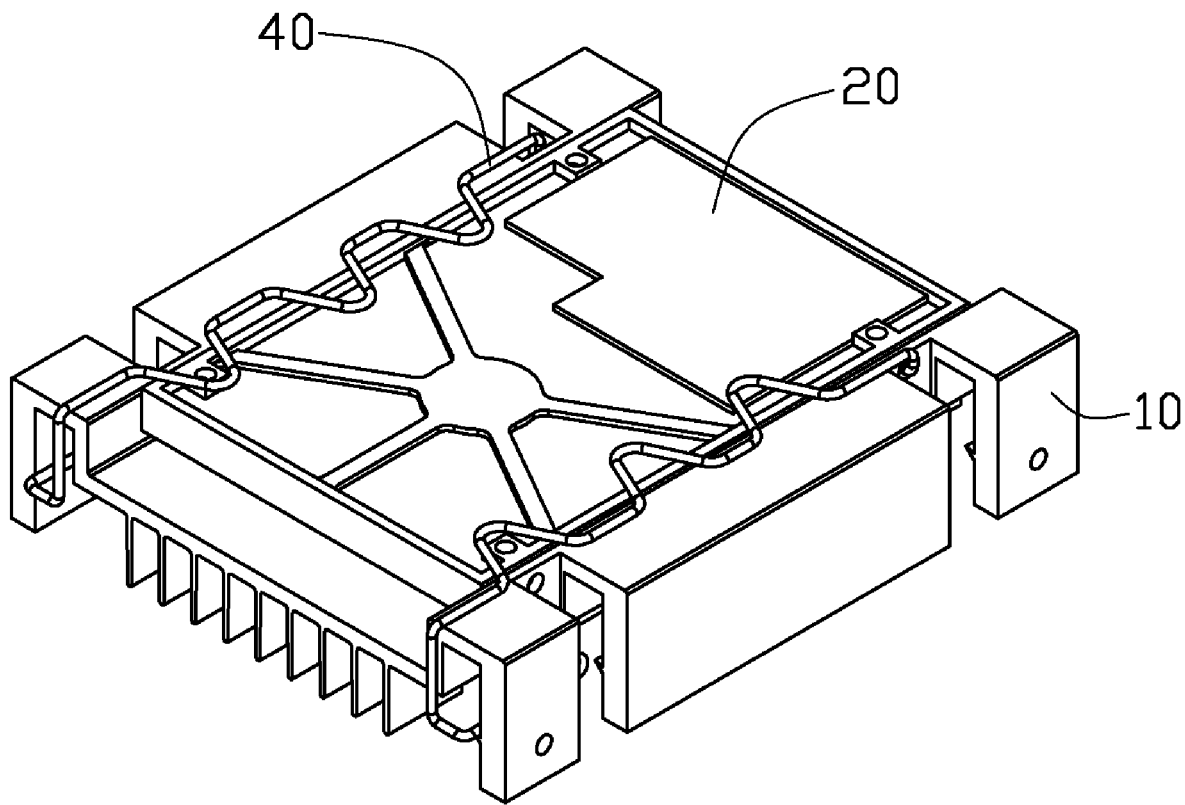
FIG. 1 is an assembled view of a fixing device in accordance with a preferred embodiment of the present invention, together with a hard disk fixed thereon.
Figure 2:
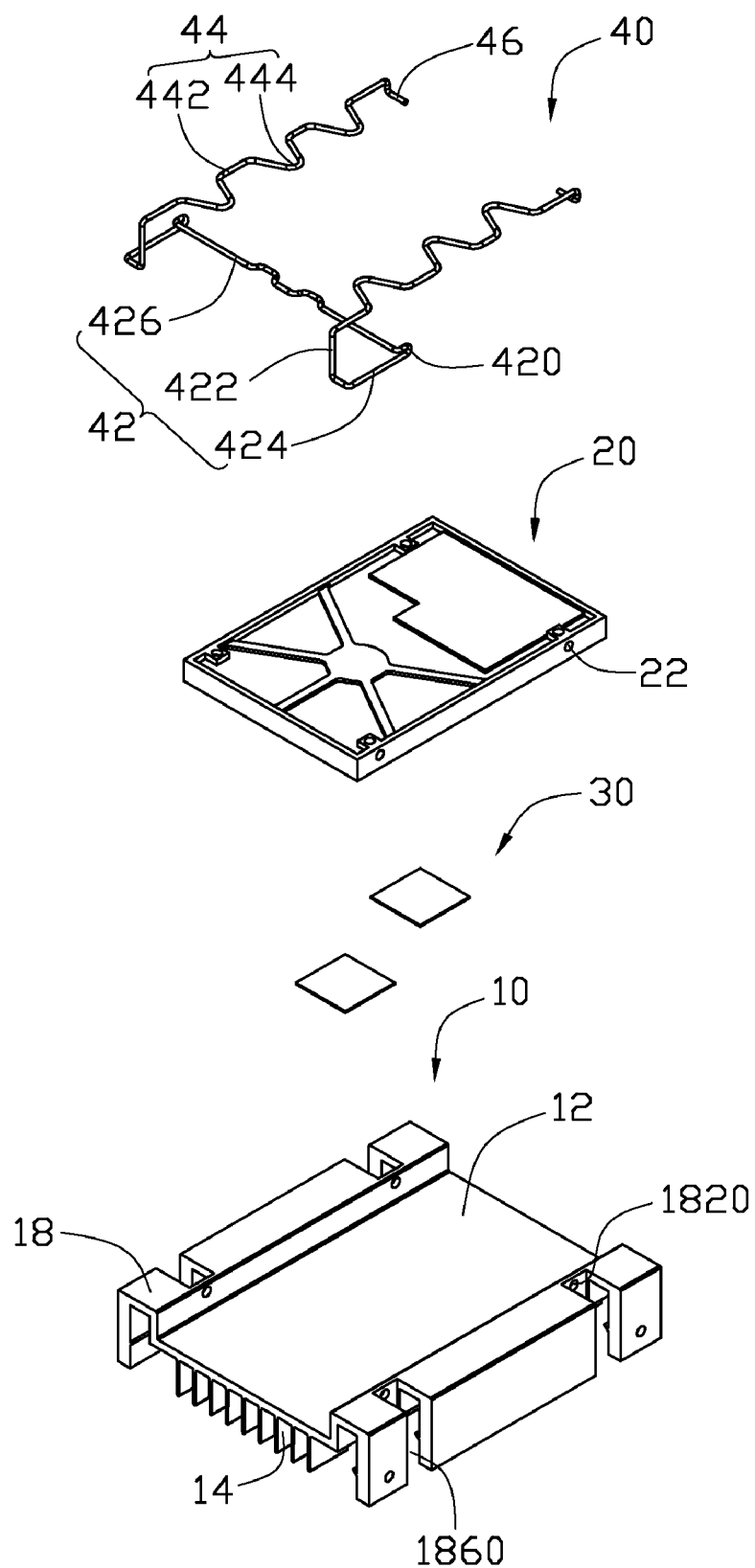
FIG. 2 is an exploded view of the fixing device and the hard disk of FIG. 1.

Referring to FIGS. 1-2, a fixing device for fixing a hard disk 20 in a computer case (not shown), comprises a fixing bracket 10 and a wire clip 40 for fastening the hard disk 20 to the fixing bracket 10. The fixing device is further provided with a plurality of heat-conducting pads 30 located between the fixing bracket 10 and the hard disk 20 for an improvement of heat transferring from the hard disk 20 to the fixing bracket 10. Furthermore, the heat-conducting pads 30 can absorb vibration of the hard disk 20 when it is in operation.

Figure 3:
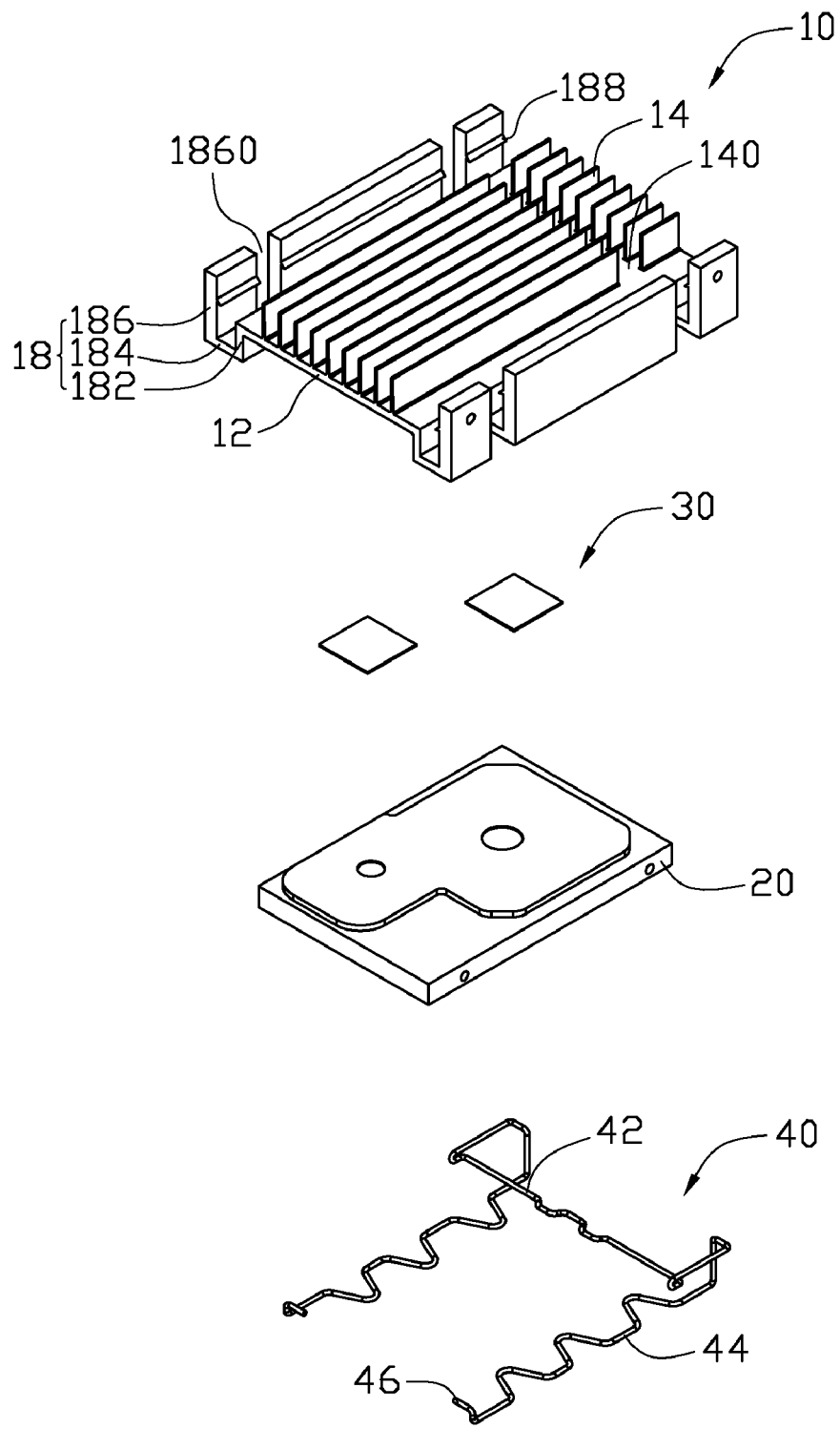
FIG. 3 is an inverted view of the fixing device and the hard disk of FIG. 2.

Also referring to FIG. 3, the fixing bracket 10 is integrally extruded from a heat conductive material, such as aluminum, and comprises a rectangular supporting body 12 to which the hard disk 20 is attached, a plurality of fins 14 extending downwardly from a bottom surface of the supporting body 12 and two fixing arms 18 respectively formed at two opposite sides of the supporting body 12 for sandwiching the hard disk 20 therebetween. Each fixing arm 18 comprises a first sidewall 182 extending upwardly from a corresponding lateral side of the supporting body 12, a second sidewall 186 located beside and out of the first sidewall 182, and a horizontal section 184 interconnecting top ends of the first and second sidewalls 182, 186. The first and second sidewalls 182, 186 are parallel to each other and perpendicular to both the horizontal sections 184 and the supporting body 12. When the hard disk 20 is disposed on the supporting body 12, the two first sidewalls 182 are snugly abutted against two opposite lateral sides of the hard disk 20 respectively, and top surfaces of the horizontal sections 184 are approximately coplanar with a top surface of the hard disk 20. The fins 14 are spaced from each other and parallel to the first and second sidewalls 182, 186. A transverse channel 140 is defined perpendicularly through the fins 14 for receiving a portion of the clip 40. Each of the first sidewalls 182 defines two through holes 1820 corresponding to two standard engaging holes 22 which are defined in each of the lateral sides of the hard disk 20. Two cutouts 1860 are defined at each lateral side of the fixing bracket 10. Each cutout 1860 is formed by transversely cutting off the second wall 186 and the horizontal section 184, for exposing the through hole 1820 in a corresponding first sidewall 182. An elongated protruding rib 188 projects inwardly from an inner surface of each second sidewall 186 and is parallel to supporting body 12 for hooking the clip 40.

Figure 4:
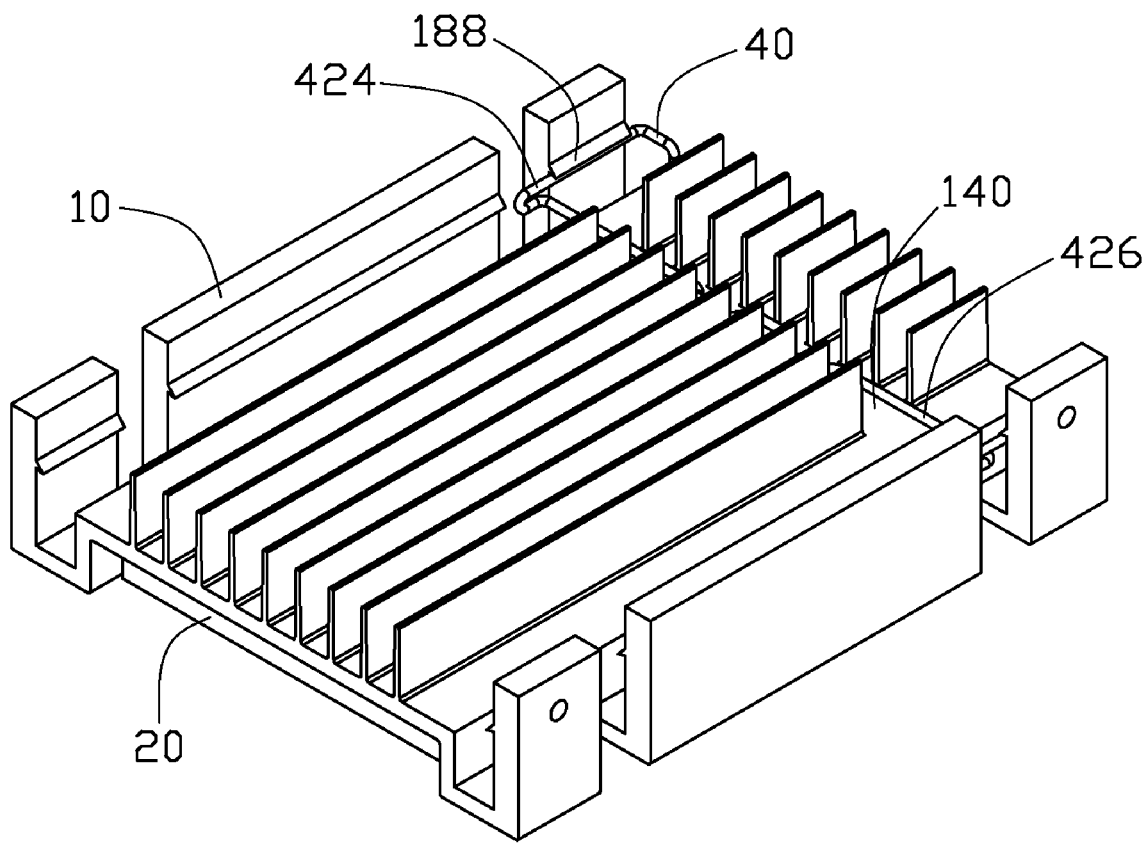
FIG. 4 is an inverted view of the fixing device and the hard disk of FIG. 1.

Also referring to FIG. 4, the clip 40 comprises two parallel pressing parts 44 resting on a top surface of the hard disk 20, and a locking part 42 extending downwardly from two corresponding ends of the pressing parts 44 and spanning over front ends of the fixing arms 18 of the fixing bracket 10 to reach the bottom surface of the supporting body 12. The locking part 42 comprises two connecting sections 422 respectively extending downwardly from the two corresponding ends of the two pressing parts 44 and spanning over a front end of the fixing bracket 10, an L-shaped hooking section 424 extending perpendicularly from a bottom end of each connecting section 422 and positioned below the supporting body 12 of the fixing bracket 10, and a pressing rod 426 interconnecting two free ends of the hooking sections 424 for pressing against the bottom surface of the supporting body 12 in the transverse channel 140. The clip 40 further comprises a bending portion 420 interconnecting the pressing rod 426 and each hooking section 424 for producing an elastic force for urging the pressing rod 426 towards the bottom surface of supporting body 12. Each pressing part 44 comprises a plurality of straight sections 442 aligned with and spaced from each other, and a plurality of curve sections 444 protruding inwardly and respectively interconnecting two adjacent straight sections 442. The straight sections 442 are alternate and coplanar with the curve sections 444. When the hard disk 20 is disposed on the supporting body 12, the straight sections 442 of the pressing parts 44 respectively rest on the top surfaces of the two horizontal sections 184 of the fixing bracket 10; the curve sections 444 press downwardly against the top surface of the hard disk 20. Two engaging hooks 46 bend downwardly and inwardly from two distal ends of the two pressing parts 44 respectively and extend correspondingly through the through holes 1820 of the two first sidewalls 182, and then insert into the engaging holes 22 of the hard disk 20, thereby for securely fastening the hard disk 20 to the fixing bracket 10.

In assembly, the hard disk 20 is disposed on the supporting body 12 of the fixing bracket 10. The pressing rod 426 of the locking part 42 abuts against the bottom surface of the supporting body 12 and is received in the transverse channel 140. The two hooking sections 424 of the locking part 42 are pressed upwardly through slant bottom faces (not labeled) of the protruding ribs 188 to respectively resiliently engage with horizontal top faces (not labeled) of the protruding ribs 188 of the second sidewalls 186. The connecting sections 422 extend over the front end of the fixing bracket 10. The pressing parts 44 rest on the horizontal sections 184 of the fixing arms 18 and urge the hard disk 20 towards the fixing bracket 10. The engaging hooks 46 of the clip 40 correspondingly extend through the through holes 1820 of the first sidewalls 182 and insert into the engaging holes 22 of the hard disk 20. Thus, the hard disk 20 is securely fixed on the fixing bracket 10.

When releasing the hard disk 20 from the fixing bracket 10, the engaging hooks 46 are moved outwardly away from the engaging holes 22 of the hard disk 20 and the through holes 1820 of the fixing arms 18, so that the pressing parts 44 of the clip 40 can be directly taken away from the hard disk 20, whereby the wire clip 40 can be separated from the hard disk 20. Thus, the hard disk 20 can be easily removed.

In the present fixing device, the fixing bracket 10 is provided with the fins 14; thus, heat generated by the hard disk 20 can be effectively dissipated by the fixing bracket 10 to the ambient air. In addition, since the wire clip 40 and the heat-conducting pads 30 can absorb vibration generated by the hard disk 20 during operation thereof, noise level caused by the operation of the hard disk 20 can be significantly lowered.

It is to be understood, however, that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A fixing device adapted for fixing a hard disk, comprising:
    a fixing bracket comprising a supporting body adapted for receiving the hard disk thereon and two fixing arms at two opposite sides of the supporting body adapted for sandwiching the hard disk therebetween; and
    a resilient wire clip comprising two pressing parts engaging with the fixing bracket and the hard disk, adapted for resting on a top surface of the hard disk and urging the hard disk towards the supporting body, and a locking part extending downwardly from two ends of the pressing parts and spanning over an end of the fixing bracket to reach a bottom surface of the supporting body and resiliently engage with the fixing bracket, thereby for fastening the hard disk to the fixing bracket.

2. The fixing device as claimed in claim 1, wherein each of the pressing parts rests on a top surface of a corresponding holding arm and has a plurality of spaced curve sections protruding inwardly adapted to press downwardly against the top surface of the hard disk.

3. The fixing device as claimed in claim 2, wherein each of the pressing parts has a plurality of straight sections resting on the corresponding holding arm and interconnecting the curve sections.

4. The fixing device as claimed in claim 1, wherein each of the two pressing parts has an engaging hook formed at a free end thereof opposite to the locking part, and the two engaging hooks bend inwardly from the pressing parts and extend through the two fixing arms adapted to engage into two opposite lateral sides of the hard disk, respectively.

5. The fixing device as claimed in claim 1, wherein each of the fixing arms comprises a first sidewall extending upwardly from the lateral side of the supporting body, a second sidewall laterally apart from the first sidewall, and a horizontal section interconnecting top ends of the first and second sidewalls.

6. The fixing device as claimed in claim 5, wherein the first and second sidewalls are parallel to each other and perpendicular to both the horizontal sections and the supporting body.

7. The fixing device as claimed in claim 5, wherein each first sidewall defines two through holes adapted to be located corresponding to two standard engaging holes which are defined in each of the lateral sides of the hard disk.

8. The fixing device as claimed in claim 7, wherein two cutouts are defined at each lateral side of the fixing bracket, transversely cutting off the second sidewall and the horizontal section, for exposing a corresponding through hole in the first sidewall.

9. The fixing device as claimed in claim 5, wherein an elongated protruding rib projects inwardly from an inner surface of each second sidewall for engaging with the locking part of the clip.

10. The fixing device as claimed in claim 1, wherein the locking part comprises two connecting sections respectively extending downwardly from the two ends of the two pressing parts and spanning over the end of the fixing bracket, a hooking section extending from a bottom end of each connecting section and positioned below the supporting body of the fixing bracket, and a pressing rod interconnecting two free ends of the hooking sections for pressing against the bottom surface of the supporting body, the bottom surface of the supporting body forming a plurality of fins thereon and the pressing rod being received in a channel in the fins.

11. The fixing device as claimed in claim 10, wherein a bending portion interconnects the pressing rod and each hooking section for producing a spring force acting on the pressing rod to press the bottom surface of supporting body.

12. The fixing device as claimed in claim 1, the fixing device is further provided with a plurality of heat-conducting pads adapted to be located between the supporting body and the hard disk for improving heat transfer between the hard disk and the supporting body, the heat-conducting pads also having vibration-absorbing effectiveness.

13. A hard disk assembly comprising:
a hard disk;
a fixing bracket comprising a supporting body to which the hard disk is attached and two fixing arms extending from the supporting body and sandwiching the hard disk therebetween, wherein each fixing arm comprises a first sidewall extending upwardly from a lateral side of the supporting body for abutting the hard disk, a second sidewall laterally apart from the first sidewall, and a horizontal section interconnecting two top ends of the first and second sidewalls;
a heat-conducting pad located between the hard disk and the supporting body; and
a resilient wire clip comprising two pressing parts attached to a top surface of the hard disk and pressing the hard disk downwardly against the supporting body, a locking part connecting two ends of two pressing parts, spanning over an end of the fixing bracket and clasping a bottom of the fixing bracket, and two engaging hooks respectively bending from two free ends of two pressing parts opposite to the locking part and engaging with the fixing bracket and the hard disk.

14. The hard disk assembly as claimed in claim 13, wherein each of the first sidewalls defines two through holes located corresponding to standard engaging holes which are defined in each of the lateral sides of the hard disk.

15. The hard disk assembly as claimed in claim 14, wherein the engaging hooks correspondingly extend through the through holes of the first sidewalls, then received in the engaging holes of the hard disk.

16. The hard disk assembly as claimed in claim 13, wherein a protruding rib projects inwardly from an inner surface of each second sidewall for hooking the locking part of the clip.

17. The hard disk assembly as claimed in claim 16, wherein the locking part comprises two connecting sections respectively extending downwardly from the two ends of two pressing parts and spanning over the end of the fixing bracket, a hooking section extending from a bottom end of each connecting section and engaging the protruding rib of the each second sidewall, and a pressing rod interconnecting two free ends of the hooking sections and pressing against the bottom surface of the supporting body, a plurality of fins being formed on the bottom surface of the supporting body.

* * * * *